United States Patent Office 3,458,280
Patented July 29, 1969

3,458,280
PROCESS FOR THE PREPARATION OF NITROSYL HYDROGEN PYROSULFATE
Giuseppe Ribaldone, Gallarat, Franco Smai, Novate Milanese, and Carmine Garbuglio, Milan, Italy, assignors to Montecatini Edison S.p.A., Milan, Italy, a corporation of Italy
No Drawing. Continuation-in-part of applications Ser. Nos. 375,621 and 375,622, June 16, 1964. This application Feb. 24, 1967, Ser. No. 618,350
Claims priority, application Italy, Feb. 28, 1966, 4,439/66
Int. Cl. C01b 21/54
U.S. Cl. 23—114
10 Claims

ABSTRACT OF THE DISCLOSURE

A process for the production of nitrosyl hydrogen pyrosulfate wherein a member of the group of nitrosyl chloride (NOCl), nitrous anhydride ($N_2O_3$) or nitrosyl sulfuric anhydride, $(NO)_2S_2O_7$, is reacted with sulfuric acid and a sulfuric-anhydride component from the group of sulfuric anhydride or sulfur trioxide ($SO_3$) and chlorosulfonic acid ($ClSO_3H$). The nitrosyl component, the sulfur trioxide component and the sulfuric acid may be present together in a ternary reaction system or the nitrosyl component may be first reacted with the sulfur trioxide component to form a reaction intermediate which is recovered and thereafter reacted with sulfuric acid.

---

This application is a continuation-in-part of our copending applications, Ser. No. 375,621 and Ser. No. 375,622, both filed June 16, 1964, and entitled, respectively, "Nitrosyl Hydrogen Pyrosulfate," and "Process for Preparing Nitrosyl Hydrogen Pyrosulfate."

The present invention relates to an improved process for the production of nitrosyl hydrogen pyrosulfate from a nitrosyl component from the group of nitrosyl chloride (NOCl), nitrous anhydride or dinitrogen trioxide ($N_2O_3$), and nitrosyl sulfuric anhydride-$(NO)_2S_2O_7$.

In our commonly assigned copending application Ser. No. 375,621, mentioned above, there are described the physical properties and characteristics of a new chemical entity which we have designated nitrosyl hydrogen pyrosulfate and have assigned the general formula $NOHS_2O_7$. This chemical entity has the apparent empirical formula $HNS_2O_8$ and the structural formula $NO \cdot HS_2O_7$. As pointed out in these applications and in a commonly assigned subsequent application Ser. No. 386,082 of July 29, 1964 (entitled Method of Producing ω-Lactams), now Patent No. 3,328,393, nitrosyl hydrogen pyrosulfate is an important nitrosating or oximating agent in chemical synthesis reactions and can be used as well for diazotization. In fact, this chemical compound is characterized by its ability to enter into many chemical reactions as a source of the nitrosonium ion in the manner of such substances as nitrosyl chloride and nitrosyl hydrogen sulfate ($NOHSO_4$)

but is substantially more stable under rigorous reaction conditions than such compounds. In the latter patent application, there is described a synthesis reaction in which molecular nitrosyl hydrogen pyrosulfate is combined with a cycloalkane carboxylic acid such as cyclohexanoic acid in a liquid phase at a temperature between 30° C. and 150° C. to yield an ω-lactam with a corresponding ring structure, e.g., caprolactam.

In our application Ser. No. 375,622, we describe a method of preparing the nitrosyl hydrogen pyrosulfate which involves the direct reaction of nitrosyl hydrogen sulfate, preferably without the intervention of any solvent other than the reactants themselves, with a sulfonating agent containing reactive sulfur trioxide. It is pointed out there that the sulfur trioxide apparently adds directly to the nitrosyl hydrogen sulfate without eliminating any fragments therefrom and without the formation of any byproducts ascribable to the nitrosyl component. The sulfonating agent may be a monomeric or polymeric sulfur trioxide $(SO_3)_n$, $n \geq 1$, or an addition compound of sulfur trioxide with substantially the general formula $SO_3$—X, X being an inorganic electron-donor compound adapted to add to sulfur trioxide. Preferably, the sulfonating agent there described is either sulfur trioxide ($SO_3$) or chlorosulfonic acid ($ClSO_3H$), where X=HCl. After excess sulfur trioxide or hydrogen chloride (derived from the chlorosulfonic acid) is driven off, the white product is a crystalline mass which has been identified as nitrosyl hydrogen pyrosulfate.

In that method, the nitrosyl hydrogen sulfate and the reactive sulfur trioxide are present in the reaction system in molar ratios ranging between substantially 1:1 and 1:5, preferably from 1:1 to 1:1.2. The reactions which apparently occur in that system, are represented below:

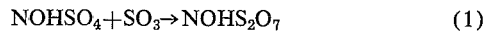
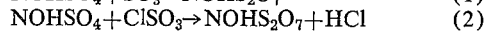

$$NOHSO_4 + SO_3 \rightarrow NOHS_2O_7 \qquad (1)$$
$$NOHSO_4 + ClSO_3 \rightarrow NOHS_2O_7 + HCl \qquad (2)$$

In practice it has been found that best results are obtained by combining the reactants slowly with constant stirring in a reaction vessel which has provision for cooling to dissipate the reaction heat. When evolution of hydrogen chloride occurs, it may be necessary to provide some form of heating in order to facilitate such evolution. It is preferred to introduce the sulfonating agent into a reaction vessel containing the nitrosyl hydrogen sulfate although it is also possible to operate in the reverse manner. If sulfur trioxide is employed, it has been found to be advantageous to use the latter in its liquid state (e.g., at a temperature on the order of its melting point or lower) to prevent its solidification in the form of polymeric sulfur trioxide which is difficult to handle. The liquid state of sulfur trioxide can be stabilized by the addition thereto of small quantities (e.g., on the order of 1% by weight) of carbon tetrachloride; these expediencies make it possible to operate at temperatures close to 0° C., the preferred temperature condition.

As previously indicated, it is possible to use an excess of the sulfonating agent (e.g., two or more moles per mole of nitrosyl hydrogen sulfate); in this case, the excess sulfonating agent functions as a diluent of the reaction mass and thereby permits more efficient stirring and easy control of the reaction conditions. At the end of the reaction, the sulfonating agent may be eliminated by distillation without difficulty. When chlorosulfonic acid is used as the sulfonating agent, it is necessary to eliminate hydrogen chloride and, for this purpose, a mild heating of the reaction mass may be used together with or independently of the subjection of the vessel to vacuum.

Occasionally, the requirement that nitrosyl hydrogen sulfate serve as a raw material is disadvantageous for the reason that it is not always readily available commercially and may require preparation prior to use in the production of nitrosyl hydrogen pyrosulfate.

It is, therefore, an object of this invention to extend further the principles originally set forth in our copending application Ser. No. 375,622 and provide an improved process for the preparation of nitrosyl hydrogen pyrosulfate.

A further object of this invention is to provide a relatively inexpensive and efficient process for producing nitrosyl hydrogen pyrosulfate, which can be carried out with relatively meager equipment and without significant concern with respect to the process variables.

Another object of this invention is to provide a process for the preparation of nitrosyl hydrogen pyrosulfate which makes use of already available starting materials.

We have now found that it is possible to prepare nitrosyl hydrogen pyrosulfate from a nitrosyl component of the group of nitrosyl chloride (NOCl), nitrous anhydride ($N_2O_3$) and nitrosyl sulfuric anhydride $(NO)_2S_2O_7$, by reacting the nitrosyl component with at least one sulfuric-anhydride component (i.e., sulfur trioxide or a compound containing reactive sulfur trioxide such as chlorosulfonic acid) and sulfuric acid. The reactions may be summarized as follows:

$$NOCl + H_2SO_4 + SO_3 \rightarrow NOHS_2O_7 + HCl \quad (3)$$
$$(NO)_2S_2O_7 + H_2SO_4 + SO_3 \rightarrow 2NOHS_2O_7 \quad (4)$$
$$N_2O_3 + H_2SO_4 + 3SO_3 \rightarrow 2NOHS_2O_7 \quad (5)$$

It will be understood that the reaction may be carried out, according to this invention, in steps by reacting the nitrosyl component first with the sulfur trioxide component to form a reaction intermediate which is then treated with sulfuric acid to yield nitrosyl hydrogen pyrosulfate. Preferably, however, the reaction is effected in a ternary system in which the sulfur trioxide component (e.g., sulfur trioxide or a compound such as chlorosulfonic acid capable of releasing sulfur trioxide), the sulfuric acid and the nitrosyl component are present simultaneously and the reaction components themselves constitute the only solvent. Thus, the reaction mixture may be obtained by dissolving sulfuric anhydride (sulfur trioxide) in sulfuric acid or by using oleum ($H_2SO_4 \cdot SO_3$) directly and combining this liquid phase with the nitrosyl component. When commercial oleum is employed, its sulfur-trioxide content is adjusted such that the molar ratio of sulfuric acid and the sulfur trioxide corresponds to the molar ratio required by the stoichiometry of the reactive (compare Equations 3 and 4 with Equation 5, supra). Furthermore, the sulfur trioxide component may consist in part of a compound capable of yielding reactive sulfur trioxide (e.g., $ClSO_3H$) and in part of sulfur trioxide in a free state or as oleum. Thus, the use of the term "ternary" to describe the reaction mixture may be applicable to reaction systems containing, as the nitrosyl component, nitrous anhydride, nitrosyl chloride and nitrosyl sulfuric anhydride, alone or in mutual admixture, the sulfur trioxide component as free sulfur trioxide, chlorosulfonic acid and oleum, individually or in mutual admixture, and sulfuric acid. Depending upon the quantity of chlorosulfonic acid used, various quantities of hydrogen chloride are produced as byproducts.

When the ternary mixture contains, in the sulfur trioxide component, both free sulfur trioxide (or oleum) and chlorosulfonic acid, the following reactions appear to take place (depending upon the nitrosyl component used):

$$NOCl + H_2SO_4 + ClSO_3H \rightarrow NOHS_2O_7 + 2HCl \quad (6)$$
$$(NO)_2S_2O_7 + H_2SO_4 + ClSO_3H \rightarrow 2NOHS_2O_7 + HCl \quad (7)$$
$$N_2O_3 + H_2SO_4 + 2SO_3 + ClSO_3H \rightarrow 2NOHS_2O_7 + HCl \quad (8)$$
$$N_2O_3 + H_2SO_4 + SO_3 + 2ClSO_3H \rightarrow 2NOHS_2O_7 + 2HCl \quad (9)$$

It is also possible to think of the reaction in terms of both sulfur trioxide and chlorosulfonic acid simultaneously so that the stoichiometric requirements for sulfur trioxide will be fulfilled partly by chlorosulfonic acid and partly by free sulfur trioxide. In a system in which chlorosulfonic acid and sulfur trioxide are present in equimolar quantities, the following equation is representative:

$$N_2O_3 + H_2SO_4 + 1.5SO_3 + 1.5ClSO_3H \rightarrow 2NOHS_2O_7 + 1.5HCl \quad (10)$$

As indicated earlier, the reaction may be carried out in two stages in which the nitrosyl component is initially reacted with the sulfur trioxide component to yield well-defined and easily purified intermdiates, such as nitrosyl chlorosulfonate, which can then be reacted with sulfuric acid to form nitrosyl hydrogen pyrosulfate. The first step of this reaction is characterized by the following equations:

$$(1) \quad NOCl + SO_3 \rightarrow NOClSO_3 \quad (11a)$$
$$(2) \quad NOCl + HSO_3Cl \rightarrow NOClSO_3 + HCl \quad (11b)$$

The nitrosyl chlorosulfonate reacts with the sulfuric acid:

$$(3) \quad NOClSO_3 + H_2SO_4 \rightarrow NOHS_2O_7 + HCl \quad (12)$$

When dinitrogen trioxide (nitrous anhydride) constitutes the nitrosyl component, the first stage of a two-stage reaction process yields a dinitrosyl trisulfate:

$$(4) \quad N_2O_3 + 3SO_3 \rightarrow (NO)_2S_3O_{10} \quad (13)$$

The latter reacts with sulfuric acid to give two moles of nitrosyl hydrogen pyrosulfate:

$$(5) \quad (NO)_2S_3O_{10} + H_2SO_4 \rightarrow 2NOHS_2O_7 \quad (14)$$

The intermediate products nitrosyl chlorosulfonate and dinitrosyl trisulfate may be purified by crystallization or by solvent extraction by conventional methods.

According to a further feature of this invention, the reaction is carried out, in liquid phase and a temperature assuring that the solution can be formed, with a slight molar excess of the nitrosyl component in terms of the NO group and the $SO_3$ group as set forth, for example, in our application Ser. No. 375,622. A suitable molar ratio between the NO group and the $SO_3$ group in the reaction system is substantially 1:1 to 1:1.2.

As previously noted, the nitrosyl hydrogen pyrosulfate produced by the present method is obtained in crude form and generally has a melting point between 112° C. and 117° C. It may be readily purified as described in the commonly assigned copending application Ser. No. 615,917, filed Feb. 14, 1967 and entitled, "Process for the Purification of Nitrosyl Hydrogen Pyrosulfate ($NOHS_2O_7$)." The product may be used directly for oximation reactions and the formation of lactams (see commonly assigned application Ser. No. 386,082 of July 29, 1964 patent No. 3,328,393) and may be heated to temperature of almost 200° C. without appreciable decomposition.

The invention as described will become more readily apparent from the following specific examples illustrating the best modes known to us for carrying out this invention in practice:

EXAMPLE I 17.8 grams of oleum ($H_2SO_4 \cdot SO_3$) at 45% by weight $SO_3$ (corresponding to 0.1 mole of $H_2SO_4$ and to 0.1 mole of $SO_3$) are used to absorb 8 grams (0.122 mole) of nitrosyl chloride. The solution thus obtained is then heated under vacuum to a temperature of 80°–90° C. in order to drive off the hydrogen chloride formed as a byproduct as well as any excess of nitrosyl chloride. The heating under vacuum was continued until the crystalline mass had a constant weight. 20 grams of crude nitrosyl hydrogen pyrosulfate were obtained with a melting point of 114°–116° C. The yield with reference to the quantity of oleum used was 96.4%.

EXAMPLE II

To 8 grams (0.122 mole) of liquid nitrosyl chloride, cooled to a temperature of −20° C., a mixture of 11.65 grams (0.1 mole) of chlorosulfonic acid and 9.8 grams (0.1 mole) of sulfuric acid (100% titer) was added. The solution thus obtained was heated under vacuum to a temperature of 70° C. in order to eliminate the hydrogen chloride and the excess of nitrosyl chloride. The heating under vacuum was continued until the white crystalline mass formed attained a constant weight. In this way 20.2 grams of crude nitrosyl hydrogen pyrosulfate was obtained having a melting point of 115°–117° C. The yield calculated with reference to the quantity sulfuric acid used amounted to 97.5%.

EXAMPLE III

A mixture of 23.6 grams (0.1 mole) of nitrosyl sulfuric anhydride (NO)$_2$S$_2$O$_7$ (obtained according to V. Wannagat, Z. Anorg. allg. Chem. 269, 232, 1952) and 17.8 grams of oleum (45% by weight SO$_3$ corresponding to 0.1 mole of H$_2$SO$_4$ and to 0.1 mole of SO$_3$) was heated to a temperature of 150° C. until dissolution; the solution was then permitted to cool. A white crystalline mass was recovered; the mass consisted of 41.4 grams crude nitrosyl hydrogen pyrosulfate having a melting point of 112°–115° C. The yield was substantially quantitative.

EXAMPLE IV

A mixture of 11.65 grams (0.1 mole) of chlorosulfonic acid and 9.8 grams (0.1 mole) of sulfuric acid was added to 23.6 grams (0.1 mole) of nitrosyl sulfuric anhydride. This admixture was then stirred at room temperature until a solution was obtained; the solution was then heated to a temperature of 100° C. in order to remove the hydrogen chloride. The white crystalline mass obtained was then heated under vacuum until constant weight was attained. In this way 41.2 grams of crude nitrosyl hydrogen pyrosulfate were obtained with a melting point of 112°–116° C. and a yield of 99.5% with respect to theoretical.

EXAMPLE V

To a mixture constituted by 17.8 grams of oleum at 45% of SO$_3$ (corresponding to 0.1 mole of H$_2$SO$_4$ and to 0.1 mole of SO$_3$) and by 23.3 grams (0.2 mole) of chlorosulfonic acid, were added 7.6 grams (0.1 mole) of liquid nitrous anhydride (N$_2$O$_3$). The solution thus obtained was heated to a temperature of 100° C. under vacuum, in order to facilitate the removal of hydrogen chloride.

The resulting white crystalline mass was further heated under vacuum until it had constant weight. 41.3 grams of nitrosyl hydrogen pyrosulfate were obtained (melting point=115°–116° C.) with a substantially quantitative yield.

EXAMPLE VI

A mixture consisting of 13.55 grams (0.1 mole) of nitrosyl chlorosulfonate prepared according to known procedures, R. Weber, Jahresber, 157 (1864); A. A. Woolf, Jour. Chem. Soc. 1053 (1950), and of 9.8 grams (0.1 mole) of sulfuric acid, was slowly heated until dissolution was complete. The solution thus obtained was then heated under vacuum to a temperature of 80°–90° C. in order to facilitate the removal of the hydrogen chloride which was gradually forming.

A white crystalline mass separated which was subjected to further heating under vacuum until constant weight was obtained. 20 grams of nitrosyl hydrogen pyrosulfate were recovered which corresponded to a yield of 96.4% calculated with respect to the sulfuric acid used.

EXAMPLE VII

A mixture of 15.8 grams (0.05 mole) of dinitrosyl trisulfate prepared according to known procedures, see H. A. Lehmann and A. Kluge, Z. Anorg. Allg. Chem. 264, 120 (1951); G. H. Weinreich, Bull. Soc. Chim. France, 12, 2820 (1963), and of 4.9 grams (0.05 mole) of sulfuric acid, was heated up to 130° C. to complete solution. Upon cooling a white crystalline mass of nitrosyl hydrogen pyrosulfate was obtained with a melting point of 114°–116° C. The yield was quantitative.

EXAMPLE VIII

Into a 100 cc. distillation flask equipped with a reflux condenser, dropping funnel for the introduction of liquids, and ground-glass couplings lubricated with polyphosphoric acid, 24.6 grams (0.193 mole) of nitrosyl hydrogen sulfate (NOHSO$_4$) was introduced.

Keeping the flask externally cooled by a cold water bath, 24.1 grams (0.301 mole) of sulfur trioxide, stabilized with 1% by weight of carbon tetrachloride, was introduced during a period of 5 minutes. The flask and reaction mixture was then permitted to stand overnight and the solid mass thereby formed was removed and very finely ground in a "dry-box." The powder thus obtained was then heated at 60°–70° C. and a reduced pressure corresponding to 10 mm. Hg, in order to eliminate the excess sulfur trioxide. 39.3 grams (0.19 mole) of a substance with a melting point of 114°–116° C. was obtained. The melting point of the substance in admixture with nitrosyl hydrogen sulfate was 50°–53° C.

The analysis by weight gave the following results: Found: NO=13.51 percent; SO$_4$=93.09 percent. Calculated for NOHS$_2$O$_7$: NO=14.48 percent; SO$_4$=92.75 percent.

The yield calculated on the base of the proposed formula NOHS$_2$O$_7$ was 98%.

EXAMPLE IX

The process in Example VIII is used but with the variant that the reaction is carried out between sulfur trioxide and nitrosyl hydrogen sulfate in about equimolecular quantities and that the nitrosyl hydrogen sulfate was introduced into the sulfur trioxide.

By using 72 grams (0.566 mole) of nitrosyl hydrogen sulfate and 50.5 grams (0.630 mole) of sulfur trioxide stabilized with 1% of carbon tetrachloride, 114 grams (0.55 mole) of a product were obtained which had a melting point as recovered of 112°–115° C., and which was recognized to be the nitrosyl hydrogen pyrosulfate identified above.

The yield was 97.2% of the theoretical value.

EXAMPLE X

Into a 250 cc. distillation flask, fitted with a ground-glass coupling lubricated with polyphosphoric acid and with a plug-type stopcock, was introduced 61.25 grams (0.482 mole) of nitrosyl hydrogen sulfate and 57.20 grams (0.490 mole) of chlorosulfonic acid.

Immediately the nitrosyl hydrogen sulfate dissolved forming an orange-colored solution; at the same time gaseous hydrogen-chloride bubbles evolved. The reaction mass was then heated to 30°–40° C. under vacuum (corresponding to a residual pressure of 3 mm. Hg) in order to facilitate the elimination of the hydrogen chloride and of surplus chlorosulfonic acid.

As the hydrogen chloride formed during the reaction was gradually eliminated, the solution became increasingly clear while on the walls of the reaction vessel a deposit of a white crystalline substance was formed. This deposit increased in mass until the whole reaction mixture solidified. The heating under vacuum was maintained for several hours until a constant weight was obtained. Thus, 98 grams (0.474 mole) of nitrosyl hydrogen pyrosulfate were obtained which had a melting point of 115°–116° C.

This melting point did not suffer any reduction when the product was admixed to the nitrosyl hydrogen pyrosulfate prepared according to the Examples I and II.

The analysis, by weight, of the product have the following results: Found: NO=14.51%; SO$_4$=93.93%. Calculated for NOHS$_2$O$_7$: NO=14.48%; SO$_4$=92.75%.

The yield, calculated with regard to the nitrosyl hydrogen sulfate was 98.1% of the theoretical value.

The X-ray diffraction spectrum of the product of Examples VIII–X was determined. The reticular distance is given in terms of Angstrom units while the relative intensity is that obtained visually. The X-ray diffraction spectrum was obtained using a Debye-Sherrer chamber having a diameter of 114.83 mm. and CuK α radiation. From the data recorded in the table it will be evident that peaks characteristic of both the nitrosyl group and the pyrosulfate group are present so that the product has the theoretical or apparent structural formula: NO—HS$_2$O$_7$.

TABLE

| Reticular distance (angstrom units) | Relative intensity |
|---|---|
| 4.84 | Weak. |
| 4.37 | Strong. |
| 4.21 | Strong. |
| 3.95 | Medium. |
| 3.52 | Strong. |
| 3.32 | Medium. |
| 3.25 | Medium. |
| 3.13 | Strong. |
| 3.00 | Weak. |
| 2.692 | Medium. |
| 2.396 | Weak. |

We claim:

1. A Process for the preparation of nitrosyl hydrogen pyrosulfate having substantially the formula $NOHS_2O_7$, comprising the step of reacting:
 a nitrosyl component selected from the group which consists of nitrosyl chloride, nitrous anhydride and nitrosyl sulfuric anhydride, with
 a sulfuric-anhydride component selected from the group which consists of sulfur trioxide and compounds capable of releasing reactive sulfur trioxide, and with
 sulfuric acid to produce said nitrosyl hydrogen pyrosulfate.

2. The process defined in claim 1 wherein said sulfuric anhydride component is chlorosulfonic acid.

3. The process defined in claim 1 wherein said sulfuric anhydride component is a mixture of chlorosulfonic acid and sulfur trioxide.

4. The process defined in claim 1 wherein said nitrosyl component is initially reacted with said sulfuric-anhydride component to yield a reaction intermediate, further comprising the steps of:
 recovering said reaction intermediate, and treating said reaction intermediate with sulfuric acid to yield said nitrosyl hydrogen pyrosulfate.

5. The process defined in claim 4 wherein said nitrosyl component contains nitrous anhydride and said reaction intermediate is dinitrosyl trisulfate.

6. The process defined in claim 4 wherein said nitrosyl component contains nitrosyl chloride and said reaction intermediate is nitrosyl chlorosulfonate.

7. The process defined in claim 1 wherein the reaction is carried out in the absence of any solvent except the reactants themselves.

8. The process defined in claim 1 wherein said nitrosyl component and the sulfuric-anhydride component are employed in a molar ratio such that the NO group is present in the reaction system in a slight excess over the $SO_3$ group.

9. The process defined in claim 1 wherein said nitrosyl component is reacted with oleum, the molar ratio of $H_2SO_4$ and $SO_3$ in said oleum being adjusted to correspond to the stoichiometry necessary to convert said nitrosyl component to nitrosyl hydrogen pyrosulfate.

10. The process defined in claim 1 wherein said sulfuric anhydride component contains chlorosulfonic acid or said nitrosyl component is nitrosyl chloride, further comprising the step of driving off hydrogen chloride from the reaction mixture.

References Cited

Pascal: Masson et Cie., "Nouveau Traité De Chimie Minérale," vol. X, p. 355 (1956).

Mellor: Comprehensive Treatise on Inorganic and Theoretical Chemistry, vol. 8, p. 697 (1928).

OSCAR R. VERTIZ, Primary Examiner

H. S. MILLER, Assistant Examiner

U.S. Cl. X.R.

23—139